US011565475B2

(12) United States Patent
Mantell et al.

(10) Patent No.: US 11,565,475 B2
(45) Date of Patent: Jan. 31, 2023

(54) METHOD AND SYSTEM FOR OPERATING A METAL DROP EJECTING THREE-DIMENSIONAL (3D) OBJECT PRINTER TO COMPENSATE FOR GEOMETRIC VARIATIONS THAT OCCUR DURING AN ADDITIVE MANUFACTURING PROCESS

(71) Applicant: Xerox Corporation, Norwalk, CT (US)

(72) Inventors: David A. Mantell, Rochester, NY (US); Christopher T. Chungbin, Webster, NY (US); Chu-Heng Liu, Penfield, NY (US); Scott J. Vader, Pittsford, NY (US); Zachary S. Vader, Pittsford, NY (US); Viktor Sukhotskiy, Amherst, NY (US); Denis Cormier, Pittsford, NY (US); Kareem Tawil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 340 days.

(21) Appl. No.: 16/845,312

(22) Filed: Apr. 10, 2020

(65) Prior Publication Data

US 2020/0324486 A1 Oct. 15, 2020

Related U.S. Application Data

(60) Provisional application No. 62/832,911, filed on Apr. 12, 2019.

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/188* (2017.08); *B33Y 10/00* (2014.12); *B33Y 50/02* (2014.12)

(58) Field of Classification Search
CPC ........................... B29C 65/393; B29C 64/393
See application file for complete search history.

(56) References Cited

U.S. PATENT DOCUMENTS

| 9,616,494 B2 | 4/2017 | Vader et al. |
| 10,040,119 B2 | 8/2018 | Vader et al. |

(Continued)

OTHER PUBLICATIONS

DMG Mori, Lasertec 65 3D Hybrid, date unknown, https://us.dmgmori.com/products/machines/additive-manufacturing/powder-nozzle/lasertec-65-3d-hybrid.

(Continued)

*Primary Examiner* — Suresh Suryawanshi
(74) *Attorney, Agent, or Firm* — Maginot Moore & Beck LLP

(57) ABSTRACT

A method operates a three-dimensional (3D) metal object manufacturing system to compensate for errors that occur during object formation. In the method, thermal image data and dimensional image data of a metal object being formed by the 3D metal object manufacturing system is generated prior to completion of the metal object. Thermal conditions are identified from these data and compared to predetermined ranges corresponding to the identified thermal conditions to identify one or more errors. For identified errors outside a corresponding predetermined difference range, the method performs an error compensation technique. The error compensation includes modification of a surface data model, modification of machine-ready instructions, or operation of a subtractive device.

32 Claims, 5 Drawing Sheets

(51) Int. Cl.
*B29C 64/188* (2017.01)
*B33Y 50/02* (2015.01)
*B33Y 10/00* (2015.01)

(56) References Cited

U.S. PATENT DOCUMENTS

| | | | |
|---|---|---|---|
| 2015/0024233 A1* | 1/2015 | Gunther | B22F 10/20 |
| | | | 264/401 |
| 2016/0167298 A1* | 6/2016 | Mantell | B29C 64/393 |
| | | | 425/145 |
| 2016/0320771 A1* | 11/2016 | Huang | B33Y 50/00 |
| 2017/0056970 A1 | 3/2017 | Chin et al. | |
| 2017/0368753 A1* | 12/2017 | Yang | B29C 64/386 |
| 2018/0275634 A1* | 9/2018 | Mcfarland | G05B 19/4099 |
| 2018/0297114 A1* | 10/2018 | Preston | B33Y 50/02 |
| 2018/0322621 A1* | 11/2018 | Craeghs | G06T 7/001 |
| 2019/0275744 A1* | 9/2019 | Tsoutsos | B33Y 50/02 |
| 2019/0346830 A1* | 11/2019 | de Souza Borges Ferreira | |
| | | | G05B 19/4099 |
| 2019/0390954 A1* | 12/2019 | Kroll | G01B 11/24 |
| 2020/0130282 A1* | 4/2020 | Fan | B33Y 50/02 |

OTHER PUBLICATIONS

Davide Sher, 10 Top Hybrid Manufacturing Companies, 3D Printing Media Network, Mar. 5, 2019, https://www.3dprintingmedia.network/the-top-ten-hybrid-manufacturing-companies/.

Ian Wright, Hybrid Manufacturing & the Future of 3D Printing for Production, engineering.com, Sep. 24, 2018, https://new.engineering.com/story/hybrid-manufacturing-the-future-of-3d-printing-for-production.

* cited by examiner

METHOD AND SYSTEM FOR OPERATING A METAL DROP EJECTING THREE-DIMENSIONAL (3D) OBJECT PRINTER TO COMPENSATE FOR GEOMETRIC VARIATIONS THAT OCCUR DURING AN ADDITIVE MANUFACTURING PROCESS

PRIORITY CLAIM

This utility application claims priority to U.S. Provisional Application Ser. No. 62/832,911, which is entitled "Geometry Error Compensation In 3D Object Printing Using Liquid Metal Jetting," and which was filed on Apr. 12, 2019, the entirety of which is expressly incorporated by reference in this application.

TECHNICAL FIELD

This disclosure is directed to liquid metal ejectors used in three-dimensional (3D) object printers and, more particularly, to operation of the ejectors to compensate for geometric and material property deviations in the object that occur during manufacture of the object.

BACKGROUND

Three-dimensional object printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject thermoplastic materials that are melted materials, such as ABS plastic. The printer typically operates one or more ejectors to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of liquid metal from one or more ejectors to form 3D objects. These printers have a source of solid metal, such as a roll of wire or pellets, that are fed into a heating chamber where they are melted and the liquid metal flows into a chamber of the ejector. The chamber is made of non-conductive material around which an uninsulated electrical wire is wrapped. An electrical current is passed through the conductor to produce an electromagnetic field that causes the meniscus of the liquid metal at a nozzle of the chamber to separate from the liquid metal within the chamber and be propelled from the nozzle. A platform opposite the nozzle of the ejector is moved in a X-Y plane parallel to the plane of the platform by a controller operating actuators to form layers of an object on the platform and another actuator is operated by the controller to alter the position of the ejector or platform in the vertical or Z direction to maintain a constant distance between the ejector and an uppermost layer of the object being formed.

Due to the lack of a leveling device or process to guarantee the flatness or uniform thickness of each layer, vertical errors, that is, errors in the z-axis direction, which is perpendicular to an X-Y plane on which the object is being formed, can accumulate and produce errors sufficient to make the object unfit for its purpose. The causes of these errors include, but not limited to, jetting non-uniformity (drop size, directionality), drop-to-drop interaction, droplet-to-previous layer interaction (flow, thermal cooling, solidification), tool path error (digitization error), motion error, and the like. In addition, the errors are not limited to those that are in a direction parallel to the z-axis. In certain object geometries and build processes, lateral flow of the liquid metal can also produce errors in the X-Y plane of the layers. Additionally, the flow and solidification of the liquid metal drops after contacting the built part is strongly influenced by the thermal state of the existing built part. Thus, the thermal state of the part being built can cause metal flow that can adversely impact the formation and material properties of the part.

During operation of such a printer, the volumes of the drops ejected from the ejector can vary from a nominal expected value. These drop variations can cause all or a portion of a layer's height to be higher or lower than intended and as the layers with these errors are stacked on one another, this height error accumulates. Additionally, the drop spacings can be different under normal printing conditions for different portions of a part, such as, the interior, perimeters, overhangs, and bridges. Consequently, this changing frequency of drop ejection in different areas can cause some part features to be more severely affected than other part features and the errors in these features may be more difficult to correct than the overall part height error previously noted. Inconsistent flow of drops around edges, pillars, thin walls, and tight corners can also cause feature shape errors. Other drop misplacements can come from errors in the relative motion between the drops and the substrate and drop timing inconsistencies arising from control tuning, timing, or drop velocity variations. Another source of errors can come from inconsistent ejection of the drops. This inconsistency includes poor or varying directionality and potentially increasing production of unwanted satellite drops. These errors cause asymmetric height and geometric errors. Detection of the conditions leading to these errors during the manufacturing process and compensating for these conditions would be useful so the halting of the manufacturing process and the scrapping of the part can be avoided.

SUMMARY

A new method of operating a metal ejecting 3D object printer adjusts operation of the printer after detecting thermal conditions that adversely affect the manufacture of a part and compensates for the thermal conditions without having to halt the manufacturing process or scrapping the part. The method includes generating thermal image data and dimensional image data of a metal object being formed by the 3D metal object manufacturing system prior to completion of the metal object, identifying thermal conditions using the generated thermal image data and dimensional image data, comparing the identified thermal conditions to predetermined ranges corresponding to the identified thermal conditions, and performing a compensation action in response to at least one of the identified thermal conditions being outside one of the predetermined thresholds that corresponds to the at least one identified thermal condition.

Another new method of operating a metal ejecting 3D object printer adjusts operation of the printer after detecting geometric discrepancies that adversely affect the manufacture of a part and compensates for the geometric discrepancies without having to halt the manufacturing process or scrapping the part. The method includes receiving dimensional data of an object being manufactured by the 3D metal object manufacturing system from at least one measuring device in the 3D metal object manufacturing system, comparing the received dimensional data to a digital data model or a surface data model of the object to identify at least one geometric discrepancy, modifying a portion of the surface data model corresponding to metal object layers not yet formed in response to the at least one geometric discrepancy being outside a predetermined range, generating machine-ready instructions using the modified portion of the surface data model, and operating the 3D metal object manufacturing system using the machine-ready instructions generated from the modified portion of the surface data model.

BRIEF DESCRIPTION OF THE DRAWINGS

The foregoing aspects and other features of operating a metal ejecting 3D object printer to adjust operation of the printer so errors arising from thermal conditions of the part are compensated without having to halt the manufacturing process or scrapping the part are explained in the following description, taken in connection with the accompanying drawings.

DETAILED DESCRIPTION

Figure 1:
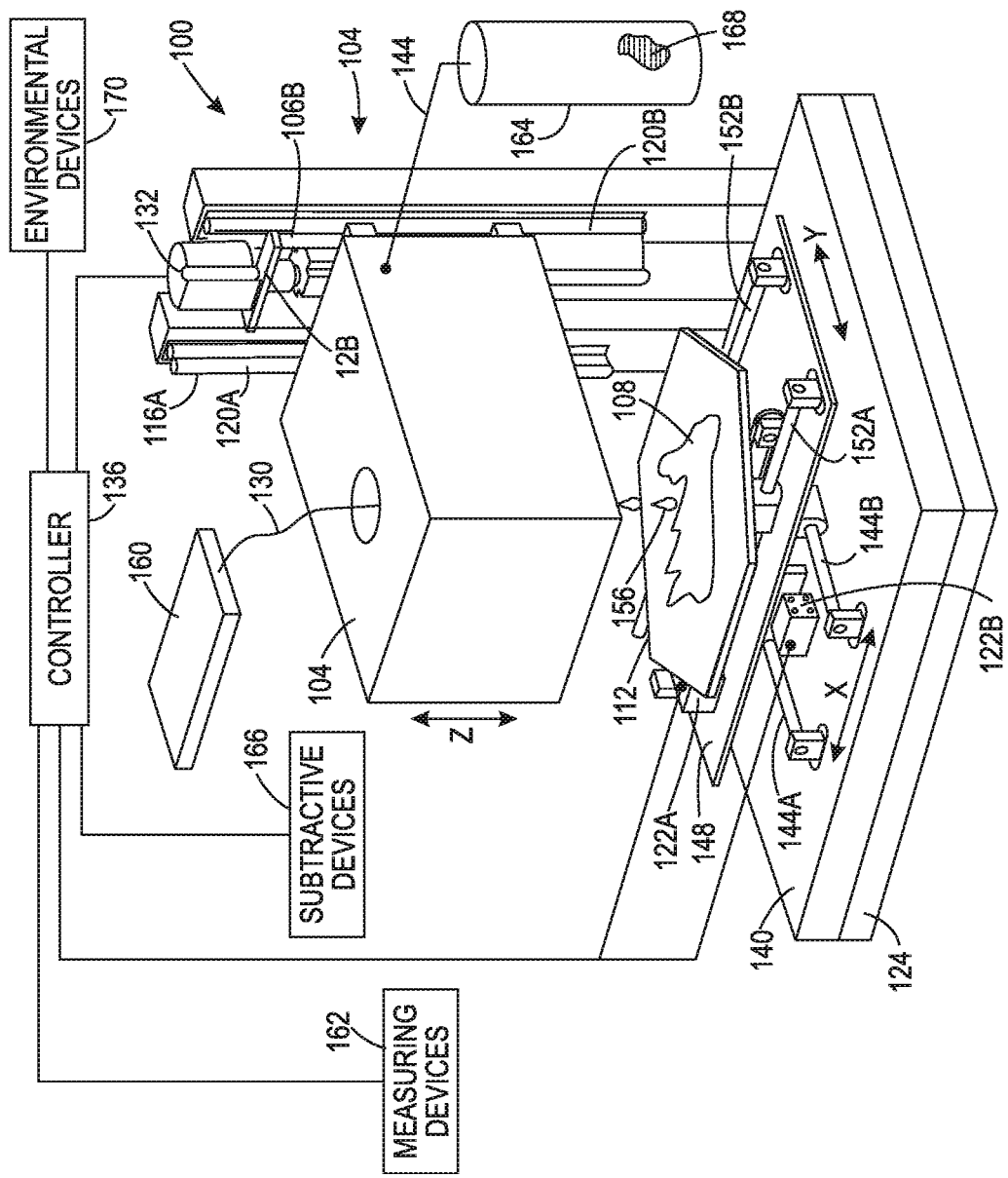
FIG. 1 depicts an additive manufacturing system that operates a liquid metal drop ejector to compensate for errors during the part manufacturing process.

For a general understanding of the environment for the device disclosed herein as well as the details for the device, reference is made to the drawings. In the drawings, like reference numerals designate like elements.

FIG. 1 illustrates an embodiment of a liquid metal 3D object printer 100 that compensates for ejection and deposition errors during manufacture of an object. In this embodiment, drops of liquid metal are ejected from a printhead 104 and these drops form a three-dimensional metal object 108 on a platform 112. A source of metal 160 feeds metal in a form, such as metal wire 130, that is melted within printhead 104 to provide liquid metal for a chamber within the printhead. The printhead 104 includes heaters that are operatively connected to the controller 136 so the controller can operate the heaters to change the temperature of the printhead. An inert gas supply 164 provides a pressure regulated source of an inert gas 168, such as argon, to the melted metal in the printhead 104 through a gas supply tube 144 to prevent the formation of aluminum oxide in the printhead. Platform 112 includes one or more heating elements that are operatively connected to the controller 136. Controller 136 operates the one or more heating elements to help regulate the temperature of the object as the object is being built.

The printhead 104 is movably mounted within Z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the printhead 104 to move the printhead along the Z-axis tracks 116A and 166B. The actuator 132 is operated by a controller 136 to maintain a predetermined distance between one or more nozzles (not shown in FIG. 1) of the printhead 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the printhead 104. Performing this X-Y planar movement of platform 112 as drops of molten metal 156 are ejected toward the platform 112 forms a layer of the three-dimensional object 108. Controller 136 also operates actuator 132 to adjust the vertical distance between the printhead 104 and the most recently formed layer to enable formation of a next object layer. While the liquid metal 3D object printer 100 is depicted in FIG. 1 as being operated in a vertical orientation, other alternative orientations can be employed. Also, while the embodiment shown in FIG. 1 has a platform that moves in an X-Y plane and the printhead moves along the Z axis, other arrangements are possible. For example, the printhead 104 can be configured for movement in the X-Y plane and along the Z axis. Additionally, while the printhead 104 has only one nozzle, it is configured in other embodiments with multiple nozzles.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During object formation, image data for an image to be produced are sent to the processor or processors for controller 136 from either a scanning system or an online or work station connection for processing and generation of the printhead control signals output to the printhead 104.

The controller 136 of the liquid metal 3D object printer 100 requires data from external sources to control the printer for object formation. In general, a three-dimensional model or other digital data model of the object to be formed is stored in a memory operatively connected to the controller 136, the controller can access through a server or the like a remote database in which the digital data model is stored, or a computer-readable medium in which the digital data model is stored can be selectively coupled to the controller 136 for access. The three-dimensional digital data model or other digital data model is typically processed by a 3D slicer to generate a surface data model of the object and this surface data model is used by the controller to generate machine-ready instructions that are executed by the controller 136 to operate the components of the printer 100 and fabricate the object corresponding to the surface data model. The surface data model produced by the 3D slicer can be a standard tessellation language (STL) data model or other polygonal mesh model and the digital data model processed by the 3D slicer can be a CAD model of the object. The machine-ready instructions can be g-code instructions that are executed by a controller for fabrication of the object by the printer. As used in this document, the term "machine-ready instructions" means computer language commands that are executed by a computer, microprocessor, or controller to operate components of a 3D metal object additive manufacturing system to form a metal object. The controller 136 executes the machine-ready instructions to control the ejection of the metal drops from the printhead 104, the positioning of stage 148 and the platform 112 with respect to one another in a X-Y plane parallel with platform 112, the separation of the printhead 102 and the uppermost layer of the object at an appropriate distance, and the operation of subtractive devices 166, such as a 5-axis milling machine, to compensate for errors detected during manufacture of an object.

The effects of unwanted variation in one or more layers must be detected before compensation of the variation can occur. This detection requires that the size and shape of the 3D object being formed must be measured during the manufacturing process. For this purpose, one or more measurement devices 162 are operatively connected to the controller 136 and positioned to obtain image data of the object. The devices 162 can be various types of optical sensors such as two-dimensional image generating camera systems, one-dimensional line scanners when either the scanner or the part is moved relative to each other, or point sensors, which can be used for more limited, but fast measurements of various portions of a part. In some cases, captured video frames from one or more video cameras can be combined to detect part size and shape from various positions or angles. Specialized lighting techniques, such as structured light, can also be used with video construction to produce shape and size data. Lighting from various angles can also be helpful, especially for generating 3D information from shadows and reflections. These techniques have inherent tradeoffs between speed, accuracy, precision and relative amounts of useful information, and a combination of more than one type of measurement device and thermal and dimensional image data processing can be used for some applications of the compensation process and configuration of the printed object.

Once the dimensional aspects, such as shape and size, of the object or features of the object are measured, they must be compared to the expected shape and size of the part. This comparison can be done by using various versions of the data corresponding to the part at various stages of the data processing. These various data stages include the original digital data model, such as CAD data of the object, or the surface data model, such as an STL file generated from the digital data model. As used in this document, "digital data model" means any collection of data that represents the structure of an object to be manufactured. As used in this document, "surface data model" means a collection of data that represents the surface of an object to be manufactured that was derived from the digital data model of the object. The surface data model is processed by the controller operating the 3D metal object additive manufacturing system to generate the machine-ready instructions that are executed to operate the 3D metal object additive manufacturing system to form the metal object. The comparison can also be made between measured shape or size and a portion of the machine-ready instructions, such as the G-code for operating the printer. Use of the machine-ready instructions provide some advantages because the instructions represent the part as printed with an increased level of process detail, such as printing direction, layer number, and the like. By modifying the machine-ready instructions, subsequent layers are corrected more directly. Other versions of the ideal shape may be useful in cases where modifications in the part design are needed to compensate for some changes from what is expected in the print process, such as differences in line growth, which require regenerating the path for one or more of the printhead nozzles through one or more layers. The comparison of the shape and size measurements obtained from the image data of the object to the digital data model, surface data model, and the machine-ready instructions identifies geometric errors, such as vertical displacement errors. A vertical displacement error is compared to a predetermined difference range and, if the error is outside the difference range, the controller determines compensation required to bring the vertical displacement error into the predetermined difference range. As used in this document, the term "vertical displacement error" means a distance between a position in the digital data model or surface data model and its corresponding position in the image data of the object along the Z axis, which is the vertical axis that is normal to the X-Y plane of the object supporting platform.

Once the comparison is made, some amount of smoothing in the difference or error profile is needed to ensure that the compensation does not amplify noise or the textures expected from individual drops or lines of drops in the last printed layer. Known compensation schemes that simply add or subtract individual drops to subsequent layers are not effective in correcting the detected shape and size errors formed with a 3D metal object forming system. That is, the addition or subtraction of drops to subsequent layers is extremely local in scope whereas the detected shape errors are typically not local in scope. Furthermore, if the liquid metal drops are deposited outside of one of the normally used tool paths, they tend to sit on top of the previous layer as hemispherical shapes rather than being integrated into the previously printed layers. In some cases, after a number of subsequent layers, an added drop can produce voids in the part being manufactured rather than simply adding height. The temperature of the overall part is affected from heat inputs and outputs such as the substrate temperature, the surrounding temperature of the air, the input from the deposited metal, and potentially radiative heat from nearby hot surfaces. Other possible sources for the local effects on drop freezing include heat from previous drops, the thermal conductivity of the part, the geometry of the part that may limit the conductivity. The time between the arrival of drop and the previously ejected drops can have a large effect on the local temperature and the freezing and merging of those drops.

In the printer 100, the controller 136 is configured with programmed instructions stored in a memory operatively connected to the controller and with appropriate components operatively connected to the controller so upon execution of the instructions, the controller detects errors caused by liquid metal drop variations and modifies machine-ready instructions to be executed by the controller to alter the drop spacing of a subsequent layer or layers or the conditions of the object and its environment. Drop spacing alteration can be done to achieve very fine variations in the metal mass deposited in all or portions of a layer or layers to compensate for errors in the heights of the printed layers. The drops resulting from the machine-ready instruction modifications are integrated into lines of drops and the lines are integrated into layers as part of the normal layer building process. Essentially, a significant advantage arises from the insertion of the altered metal mass in a semi-continuous manner because the almost continuous variability of the drop spacing and the process in which one molten drop lands next to a previously cooling drop forms a line of metal that is integrated into the layer as it is being formed. The drop spacing alteration also provides control over the lines of metal being printed adjacent, on top of, or nearby other previously printed lines to form layers or other structures, which is also advantageous. Where possible, the drop spacing alteration is done in a way that preserves the original tool path defined by the machine-ready instructions for a layer. Reducing or increasing drop spacings locally increases or decreases the drop mass, respectively. Also, the programmed printing speed can also be changed to preserve the nominal firing rate of the drops where applicable.

In one example of this type of machine-ready instruction modification to effect drop spacing changes, the originally produced G-code used for normal printing looks like the following and the comments for the instruction following the ";" character explain the results of the instruction:

G0 X0 Y0; move to location (0,0)
PULSE_DISTANCE=0.35; drop spacing 0.35 mm
PRINT_ON; Start printing
G1 Y100; print to new Y position (0,100) in a straight line
G1 X0.5; print to new X position (0.5, 100) in a straight line
G1 Y0; print to new Y position (0.5, 0) in a straight line
G1 X1; print to new X position (1,0) in a straight line
G1 Y100; print to new Y position (1,100) in a straight line
PRINT_OFF; stop printing Upon detection of an error caused by drop variation, compensation is implemented by adding an input to the G-code to control the drop spacing for each move or to break up some of the moves to change the drop spacing more continuously. An input can be added by including a parameter D to a G1 command followed by the drop spacing for the move. Alternatively, one parameter can be included for each start drop spacing and each end drop spacing, respectively. Modifying the code example given up in this manner produces a machine-ready instruction that replaces G1 Y100 with the following instruction: G1 Y100 D0.35,0.4, which results in printing to a new Y position (0,100) beginning with a drop spacing of 0.35 mm drop spacing and ending with a drop spacing of 0.4 mm. In one embodiment, the controller is configured with programmed instructions to identify a linear interpolation between the starting and ending drop spacings that is used along the printed line.

A controller configured as described above to execute modified G-code instruction can also adjust the velocity of motion to no more than a given maximum value during the printing of the line to preserve the firing frequency. Continuing the present example, the G-code is modified to include an instruction: G1 F3000, which causes the controller to operate an actuator to move the printhead at a constant speed of 50 mm/sec or 3000 mm/min. This instruction is used instead of: PRINT_FREQUENCY=400, which causes the controller to operate the actuator to accelerate and decelerate the movement of the printhead during programmed moves as drop spacing changes to preserve the firing frequency. The reader should note that acceleration and deceleration cause firing frequency changes under normal circumstances so this instruction does not force constant firing frequency as much as it prevents exceeding the intended firing frequency. Also, for sequential moves, the drop spacing between the last drop printed in the previous line printing and the first one for the next commanded G1 line printing instruction is a new drop spacing value regardless of the drop spacing identified in the previous G1 line printing instruction.

Altering the machine-ready instructions to compensate for a detected high portion in a region printed by the instructions in the example above provides:

PRINT_ON; start printing
G1 Y50 D0.35, 0.4; printing to a new Y position with drop spacing that starts at 0.35 mm and increases to 0.4 mm at end of the printing
G1 Y100 D0.4, 0.35; printing to a new Y position with drop spacing that is the reverse of the immediately previous instruction
G1 X0.5; printing to a new X position with drop spacing continuing at 0.35 mm
G1 Y50 D0.35, 0.4; printing to a new Y position with drop spacing that starts at 0.35 mm and increases to 0.4 mm at end of the printing
G1 Y0 D0.4, 0.35; printing to a new Y position with drop spacing that is the reverse of the immediately previous instruction
G1 X1; printing to a new X position with drop spacing continuing at 0.35 mm
G1 Y50 D0.35, 0.4; printing to a new Y position with drop spacing that starts at 0.35 mm and increases to 0.4 mm at end of the printing
G1 Y100 D0.4, 0.35; printing to a new Y position with drop spacing that is the reverse of the immediately previous instruction
PRINT_OFF; stop printing Printing moves can be broken down into smaller segments for more complicated changes in the contours of the object. These changes for implementing the correction can be provided in a map to the controller and the drop spacings in the instructions are modified as shown in the example above that use a linear function for the modifications. Alternatively, the instructions can implement changes to drop spacings for individual moves using non-linear functions rather than the linear functions discussed above. For example, polynomials, splines, and other algebraic functions or combinations of functions, such as absolute values, exponents, or logarithms can be used in the instructions. The drop spacings can be provided in move instructions and the instructions with their associated drop spacings can either be for one line, as in the linear example above, or for multiple lines to define both the function and the move. The function that defines the drop spacing can apply to a single move or to a series of moves. The map can be data of the modified layers, such as CAD or STL data, or as a series of shapes such as splines, Gaussian functions, or others. The map or shapes are associated with tool paths for forming the part and the modifications for the ejection of the metal drops are included in the tool paths provided for the part printing process. Other forms of machine-ready instructions and corrections are possible and are contemplated within the meaning of the terms machine-ready instructions and modified machine-ready instructions.

A build error identified as a uniform variation from an intended height is caused by a difference in drop volume from the nominal drop volume. The additive manufacturing system can either measure the drop volume or determine the drop volume from the changes in height as the part is printed. The system stores both the current calculated drop volume or a value related to the drop volume and a correction value for the excess or deficit in the height of previously printed layers. The correction added for the subsequent layer can compensate for the entire variation or a portion of the measured difference for control stability. Changes can be made in the parameters used to drive the liquid metal drop ejector to change the drop volume. The electromagnetic waveform is primary driver of drop volume. Waveforms typically contain one or more pulses. Changing the magnitude and/or the temporal variation of one or more of the pulses or the time between pulses can change the drop volume. For example, drop volume changes can be determined from the following equation: $M_i=M_d+f^*(M_0-M_d)$, where $M_0$ is the nominal drop mass, $M_d$ is the determined drop mass, and f is a factor for how much correction should be implemented at the $i^{th}$ layer. Initially the correction may be greater than 1.0 so the part height can make up the difference. Eventually f approaches 1 so that the mass is at the intended value $M_0$. This type of correction adjustment for subsequent layers brings the part height to the intended layer height and ensures that layers printed subsequently are at the intended layer thickness. In addition the temperature of the ejector can be altered to change the heat carried by the metal drops and the firing rate can be changed to modify the time between the drops and thus the thermal environment encountered by a drop by changing the amount of time for heat dissipation from previously ejected drops. Alternatively or additionally, changes in the drop spacings can be determined from a combination of the entire difference and a smaller portion of the difference. For example, drop spacing changes can be determined from the following equation: $DS_i=DS_0^*(M_d/M_0+f^*C)$, where $M_0$ is the nominal drop mass, $M_d$ is the determined drop mass, C is the entire measured difference, $DS_0$ is the nominal drop spacing, $DS_1$ is the drop spacing to use for the next layer, and f is a factor for how much of the correction should be implemented at the $i^{th}$ layer. This type of correction adjustment for subsequent layers brings the part height to the intended layer height and ensures that layers printed subsequently are at the intended layer thickness. Monitoring the height of the part and detecting the change of height for subsequent layers continues so further modifications can occur throughout the part build.

In another variant, the relationship between the drop spacing correction ($DS_i/DS_0$) and part height error can be directly modeled via a machine learning approach. To accomplish this approach, a set of training examples of various levels of drop spacing plotted against printed part measurements at various layers is acquired offline. This data is used to train a regression, or more generally, a machine learning model, such as a support vector machine, random forest, or artificial neural network, which takes a layer number and part height error as inputs and predicts the required correction in drop spacing to be applied at a given layer.

For errors that cause variation across the surface of the part, corrections need to be made over a local layer area rather than across the entire layers of the part. The local areas may be specific to certain types of toolpaths used to generate the part. For example, the perimeter of the part may be generally built at different heights from the interior of the part, also known as the infill. Also, various parts of a perimeter that have different distances outside of previous printed layers, such as occur at overhangs, may be built at different heights. Unsupported connections between features, known as bridges, can be extremely sensitive and may even break with improper printing. These different parts of the toolpath may be corrected by changes in the thermal properties exhibited by the part or in drop spacings tuned to the specific geometry of the toolpath that is being printed. In the case of bridges, they may need to be reformed in subsequent layers, if broken. Consequently, the drop spacing changes can be chosen specifically for the type of feature being formed and the specific errors detected in those types of features. The drop spacing changes are obtained from the height measurements from subsequent layers of the remaining layers of the object. Typically, the printer combines drop spacing changes into the printing as a continuous function, changing drop spacing for each move or a series of moves in the tool path based on the height correction. This machine learning approach can be extended to include X and Y locations as additional inputs to the model during both training and real-time predictions.

The compensation alterations described above can be made over a plurality of layers to ensure a stable approach to the corrected value as long as enough layers remain to achieve the compensation. Additionally, the drop mass and drop spacing changes can be limited to a range of drop mass and drop spacings so artifacts are not produced in the printing process. Once corrective measures have been taken to adjust the part for the measured height difference, continued correction is needed to compensate for the drop volume estimated from the part height errors. Thus, corrections in drop mass and drop spacing are continued in subsequent layers to correct for the drop volume variation preemptively.

Some types of errors require changes in the tool path of the printing. These tool path changes are most likely necessary at object perimeters or for support structures. That is, adjustments in the outside boundary dimensions of a layer along the X and Y axes typically require modifications to the tool path. These tool path edits are provided in modified machine-ready instructions supplied to the printer as they are needed to form a layer. The tool path along with any embedded machine-ready instructions that change the drop spacings or along with an associated map or defined shape corrections are provided in a continuous manner or shortly before the beginning of the modified moves for the printing of a layer. Alternatively, references that identify locations or names in a storage device containing associated tool path data for unprinted paths, layers, or both can be provided to the controller so the controller can retrieve this data from the storage device. This data referenced by the locations or names can be populated as corrections are determined prior to the printing of layers that require the application of corrections.

An example of conditions requiring tool path changes in the X-Y plane occurs where a part changes shape along its height. If the thicknesses of sequential layers differ from the intended height of the layers then the changes in the shape of the object tend to occur at the height of a given layer rather than at the intended height of the part. Consequently, the tool path is altered to form the object with the intended shape at the actual height of the part rather than at the initial intended height of the printed layer. This tool path alteration is needed to reproduce the intended shape.

Figure 2:
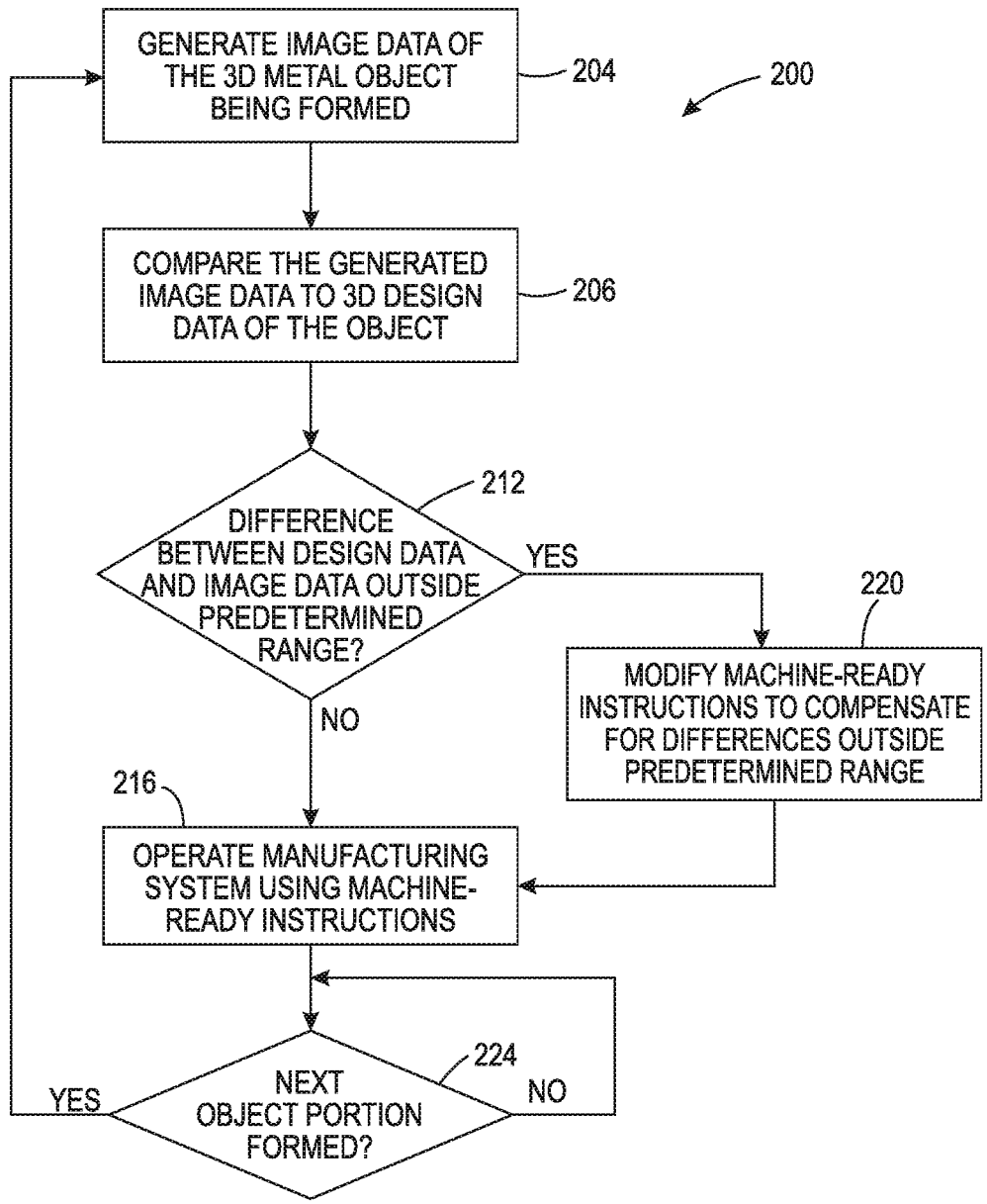
FIG. 2 is a flow diagram of a process used by the controllers of the additive manufacturing system of FIG. 1 to compensate for errors caused by drop size variations during manufacture of a part.

A process for operating the printer shown in FIG. 1 is shown in FIG. 2. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 2 is a flow diagram of a process 200 that operates the printing system 100 to compensate for displacement errors detected during formation of a metal object by the system. The process begins with the generation of image data of the metal object being formed (block 204). The generated image data is compared to the digital data model or surface data model of the object that was used to produce the machine-ready instructions that are executed to operate the system and form the object (block 208). If any dimensional differences between these data and the generated image data are outside of predetermined range (block 212), the machine-ready instructions are modified to compensate for the differences outside of the predetermined range (block 220). Otherwise, the machine-ready instructions originally generated are used to form another portion of the object (block 216). When the next portion of the object is formed (block 224), such as a layer or part feature, the process is repeated with the machine-ready instruction modifications being performed as described above.

In a metal object manufacturing system using liquid metal drop deposition, the spread, flow, and solidification of the liquid metal drops are critical to object quality. Too much flow results in inaccurate geometry control and too little flow causes insufficient contact between drops resulting in voids and insufficient bonding. These voids and bonding strength ultimately determine the material properties and the mechanical strength of the final built part. Thermal properties and states of the metal drops and their immediate contact surroundings are factors affecting the flow and solidification processes. In general, when the temperatures are high, the metal droplets spread and flow more and cooler temperatures allow drops to freeze without merging. The thermal conditions that affect the flow of the ejected metal drops include, but are not limited to, the temperature of the ejected drops, the temperature of the surface where the drops will land, and the temperature of the inert shield gas. The surface temperature where the drops land is affected by the temperature of the platform 112, the environmental conditions, such as temperatures and humidity surrounding the part, and the build history of the part. Build history means the configuration of the underlying layers, the temperatures of the underlying layers, and the elapsed time since formation of any underlying layer. Using a predictive model based on platform temperature and build history to identify the thermal conditions for a part becomes less accurate as the uppermost layer of the object is increasingly separated from the platform 112 and the complexity of the part geometry grows. Consequently, the surface conditions of the part need to be monitored, particularly as the distance between the uppermost layer and the platform 112 increases.

In some embodiments, the devices 162 include thermal imaging devices such as infrared (IR) detectors and thermal imaging cameras to monitor thermal conditions on and around the part as it is made. These devices generate a two-dimensional thermogram of the intensities of the temperatures detected by a phased array of IR detectors and generate electrical signals corresponding to the thermogram. These signals are processed by a signal processor to provide thermal image data of the object to the controller 136. The controller processes the thermal image data of the object and the image data of the object surface generated by the visible image data devices identified above to identify the thermal conditions and the configuration of the object surface. While two-dimensional thermal condition monitoring is preferred, one or more point sensors can be included in the measurement devices 162 for this purpose. Due to space limitations, measurements of the thermal conditions are typically made at any location sometime after drops have been printed. Therefore, models may be useful to reconstruct the thermal environment where the drops are printed and solidify on the part. The thermal measurements greatly improve the accuracy of these models The flow and solidification of the liquid metal drops after contacting the part being manufactured is strongly influenced by the thermal conditions. In one method of compensation, the controller determines that at least one measured thermal condition is not within a predetermined range of values that are optimal for metal drop flow and layer formation so it alters the temperature of local areas of the object. The environmental conditions of these local areas can be affected by the controller 136 operating one or more environmental devices 170 (FIG.1), such heating or cooling devices that are configured to direct heat or cooling toward the object. In another method of compensation, the controller modifies the machine-ready instructions to alter the ejection of the metal drops in subsequent layers. In another embodiment, the controller modifies the surface data model produced by the 3D slicer and regenerates the machine-ready instructions for subsequent layers from the modified slicer data. In yet another embodiment or in combination with previously described embodiments, the controller operates a subtractive component, such as a 5-axis milling machine or an electrical discharge machining (EDM) device, to remove excess material and debris caused by material removal and to treat layer surfaces before the layer is covered.

Figure 3:
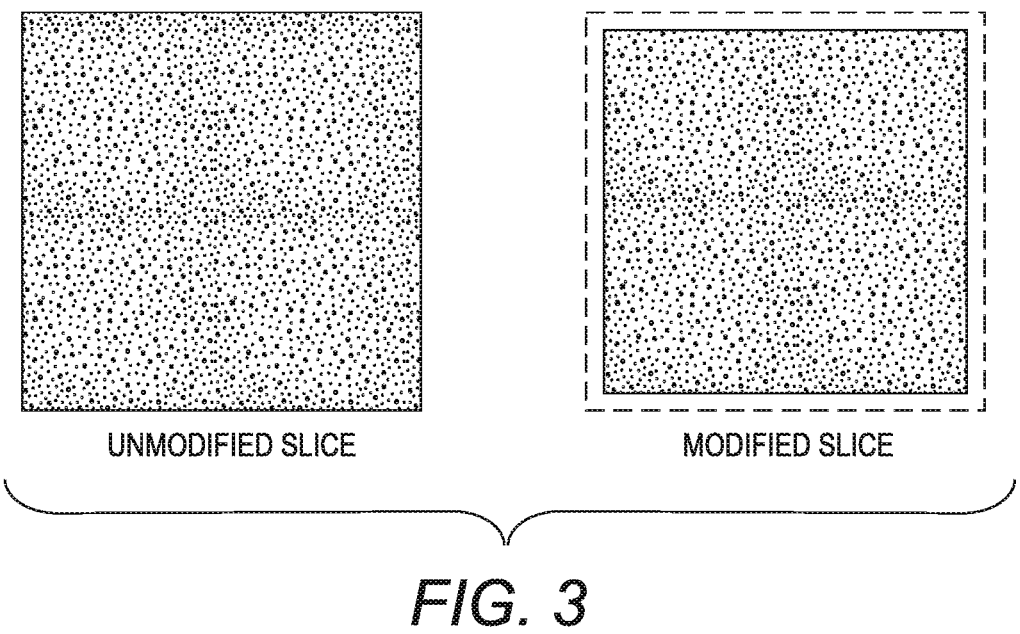
FIG. 3 is a plan view of an unmodified layer slice and the adjustments that can be made to the layer slice to compensate for detected errors.
Figure 4:
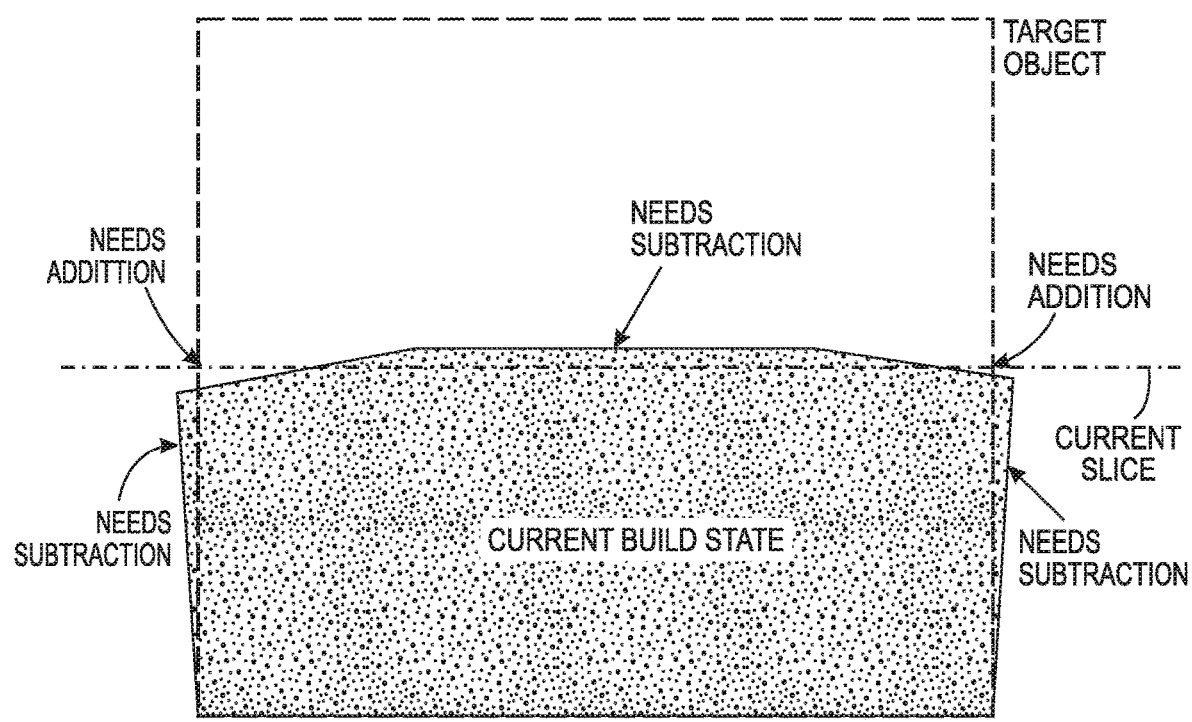
FIG. 4 is a plan view of a layer to be formed in an object and an example of its modification to compensate for the outward flow of metal drops arising from thermal conditions detected through use of an object model.

An example of data modification compensation occurs when metal drops flow outside a lateral boundary for a layer of the part in the X-Y plane because the thermal conditions and surface structure cause the drops to flow too freely before freezing in place. In response, the controller modifies the surface data model produced by the 3D slicer or the machine-ready instructions that were generated from the surface data model to reposition the ejector so the metal drops fall further away from the boundary. Thus, while the drops may still flow outwardly due to surface elevations and thermal conditions, they remain within the object boundary. For instance, FIG. 3 is a plan view showing how a slice intended to have the dimensions shown in the leftmost layer can be modified (in effect, shortened in both dimensions, as shown in the rightmost layer) to compensate for the outward flow of material as determined from the comparison of the measured thermal conditions with the predetermined ranges. Even though these drops freely flow because the surface temperature exceeds the predetermined range, the edges still remain within the part specifications. Other types of defects for which the system can compensate are illustrated in FIG. 4. These defects include areas requiring material removal (subtraction) and areas requiring material addition.

Figure 5:
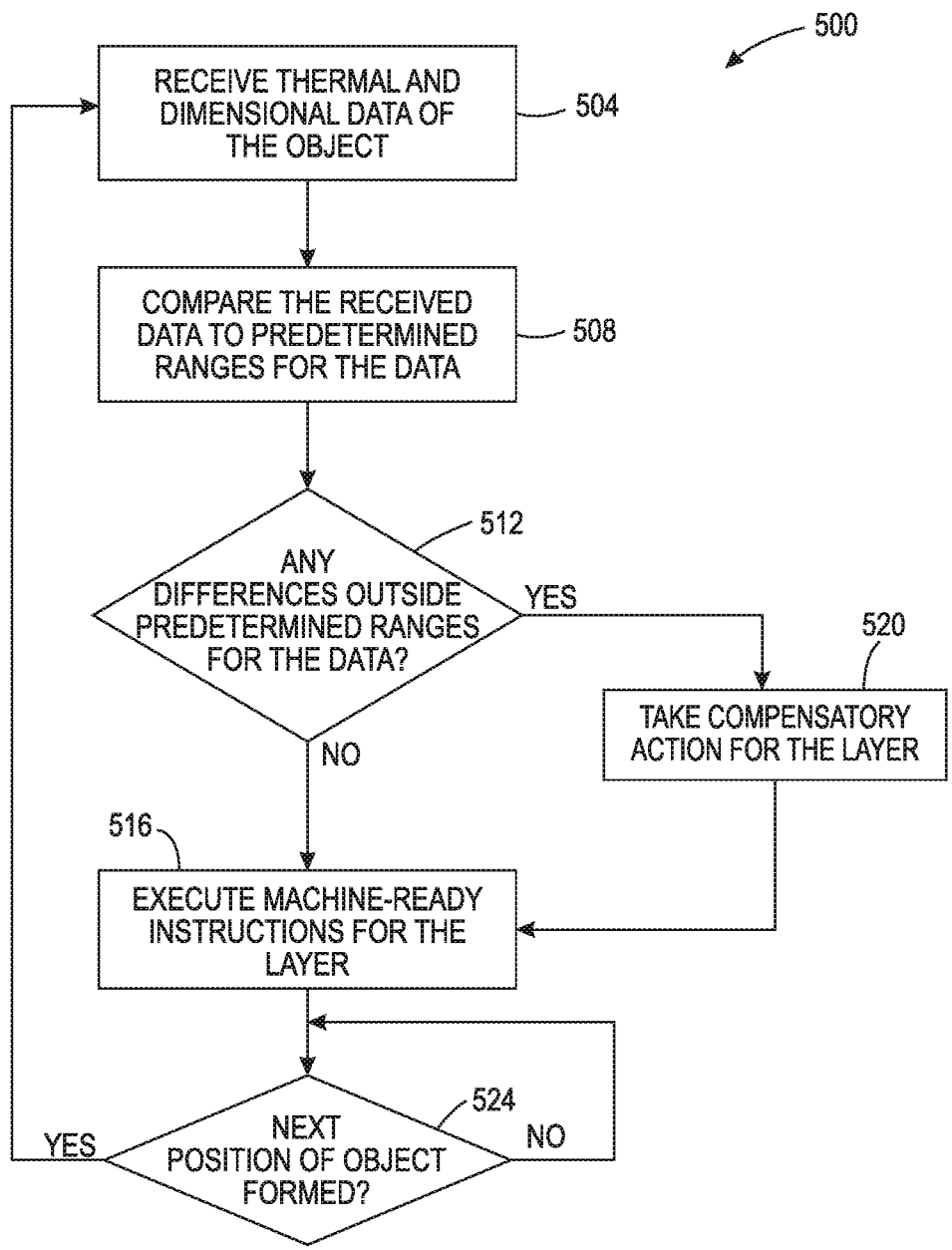
FIG. 5 is a flow diagram of a process used by the controllers of the additive manufacturing system of FIG. 1 to compensate for errors caused by thermal conditions of a part during manufacture of the part.

FIG. 5 is a flow diagram of a process 500 that operates the printing system 100 to compensate for geometric errors and adverse thermal conditions detected during formation of a metal object by the system. The process begins with the controller 136 receiving from the measuring devices 162 thermal image data and dimensional image data of the surface of the metal object being formed (block 504). The received thermal and surface image data of the object are used to identify thermal conditions on or near the object and compare those thermal conditions to predetermined ranges (block 508). If any of the identified thermal conditions are outside the predetermined ranges (block 512), actions are taken to compensate for the differences outside of the predetermined range (block 520). These actions include modifying the machine-ready instructions, modifying the surface data model for the remainder of the part, or operating components, such as a 5-axis milling machine or one or more thermal conditioning devices, to change the surface configuration or thermal conditions of the object before continuing to form additional layers in the object. Otherwise, the machine-ready instructions originally generated are used to form another portion of the object (block 516). When the next portion of the object is formed (block 524), such as a layer or part feature, the process is repeated. The machine-ready instructions and surface data model modifications that can occur as part of the processing in block 520 are performed as described above.

In the metal object manufacturing system 100, some errors occurring during manufacturing cannot be compensated by modifying the additive manufacturing and environmental aspects of the system. To address these errors, the system 100 includes subtractive devices, such as a 5-axis milling machine or an EDM device, to remove material. The errors addressed by subtractive devices include geometric discrepancies that are identified by comparing the dimensional image data to the digital data model or the surface data model. These discrepancies include, but are not limited to, deviations in feature volumes, flatness of a surface or feature, and the misplacement of an outer boundary of a layer or object feature. These deviations can indicate object defects, such as internal voids, anomalies in the deposition process, or other process control problems that may arise from adverse thermal conditions or jetting irregularities. If these deviations are large enough, they can interfere with subsequent printing. Such differences suggest the part may be weakened at the locations where these differences exist. Differences between a measured feature height and an expected feature indicate the possibility of a risk collision with the printhead or other system hardware, such as print head mounting structures, chamber walls, and the like. These detected differences can also identify multiple regions of the part that do not touch one another although the surface data model indicates the regions should touch or that a single region has been split into multiple regions rather than being contiguous. These errors are particularly problematic in objects formed with electrical circuits or components. When errors such as these are detected, a subtractive process can either locally remove the defect or remove entire layers so the additive manufacturing process can repair or reform the affected region. While milling and EDM have been identified as useful subtractive components, other subtractive processes could be used, such as drilling, laser ablation, and the like.

The incorporation of subtractive devices into the system 100 provides some abilities and requires some restraints over previously known additive manufacturing systems. Among the abilities are the use of the subtractive device to remove and smooth the texture of surfaces of the part and the integration of the subtractive device operation with the tool path and metal ejection compensation described above. Additionally, the use of one or more subtractive devices can prevent propagation of defects, which can occur during formation of parts without any feedback for defect detection and compensation. For example, small changes in layer boundary positions while printing layer perimeters and overhangs for features often cause subsequent layers to have the same defect. Continued printing without subtractive compensation can even exacerbate the defect since the drops are landing on an unknown surface shape. By compensating for defects in the height of the layers and the edge position in X-Y plane, the growth of large defects can be prevented from affecting appearance, accuracy, and strength of the process and reduce the part failure rate. Restraints include robust methods for removal of removed material as part of the manufacturing process, which includes monitoring and maintaining part temperature as described in more detail below. Additionally, a method of calibrating the location of the part with respect to the tool is also required.

The ability to remove and finish portions of a part is especially advantageous for surfaces in 3D printed parts that are not accessible after a part is printed. During manufacture, however, many of these surfaces are accessible and can be trimmed between formation of layers. This ability makes the purposeful formation of one or more layer perimeters a bit larger than intended and then partially trim the latest printed layers with a subtractive device, such as a 5-axis milling machine. The trimming of previous layers also provides a smooth surface along the side walls of the object. The trimming can occur at multiple times for multiple layers until the intended shape is obtained. The subtractive tool not only includes X, Y, and Z axis control but also angle control so the tool can match the overhang angle of a feature and present the tool at an appropriate angle for drilling, boring, or reaming holes. Once a layer is machined, the boundaries of the part change so formation of subsequent layers must compensate for the removed material. After machining an outer surface, the overhang angle required for subsequent metal drop ejection is increased so compensation for the increased angle is needed.

Removal of debris from the object is important for enabling the effective integration of subtractive components. Chips embedded in crevices of the part can become trapped and may not be removable later. Debris left on the surface of a part may interfere with formation of subsequent layers. Additionally, the object is at elevated temperatures during its manufacture. Removing hot chips of material from a part can be problematic since the chips can be sticky and are more likely to adhere to the part. Cooling the part before machining is necessary in some cases. While an environmental device 170 can direct a stream of cooling air toward the surface to be machined, directing a flow of a volatile liquid, such as water, is more effective for reducing cooling times. During machining, water, air, and vacuum can all be generated by one or more environmental tools 170 and used for effective particle removal.

Calibration of the Z-axis of the subtractive component with the Z-axis of the part being formed is important for accurate synchronization of the tool. To perform the calibration, a test part can be printed so the axis of each tool and axis of control can then be used to make marks or indicia in the test part. These marks are positioned to help identify position, depth, and angle so the tool and its independent axes of control can be correlated with the printed part. This calibration can then be used to align axes with respect to each other.

Although the compensation scheme presented above has been described within the environment of a magnetohydrodynamic (MHD) liquid metal jetting system, it could also be used in other liquid metal jetting 3D printing technologies in which drops of a build material solidify quickly upon contact with previously jetted and solidified drops.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a three-dimensional (3D) metal object manufacturing system comprising:
    generating thermograms of temperature intensities on a metal object being formed by the 3D metal object manufacturing system and processing the thermograms to generate thermal image data of the metal object prior to completion of the metal object;
    generating dimensional image data of the metal object being formed by the 3D metal object manufacturing system prior to completion of the metal object;
    identifying thermal conditions using the generated thermal image data and the generated dimensional image data;
    comparing the identified thermal conditions to predetermined ranges corresponding to the identified thermal conditions; and
    performing a compensation action in response to at least one of the identified thermal conditions being outside one of the predetermined ranges that corresponds to the at least one identified thermal condition.

2. The method of claim 1, the performance of the compensation action further comprising:
    modifying machine-ready instructions for forming metal object layers not yet formed; and
    operating the 3D metal object manufacturing system using the modified machine-ready instructions.

3. The method of claim 2 wherein the machine-ready instructions are G-code statements.

4. The method of claim 1, the performance of the compensation action further comprising:
    modifying a surface data model corresponding to metal object layers not yet formed;
    generating machine-ready instructions using the modified surface data model; and
    operating the 3D metal object manufacturing system using the machine-ready instructions generated from the modified surface data model.

5. The method of claim 4 wherein the surface data model is standard tessellation language (STL) data of the metal object.

6. The method of claim 5 wherein the machine-ready instructions are G-code statements.

7. The method of claim 2, the modification of the machine-ready instructions further comprises:
    changing drop spacing parameters identified in the machine-ready instructions.

8. The method of claim 2, the modification of the machine-ready instructions further comprises:
    changing at least one tool path identified in the machine-ready instructions.

9. The method of claim 2, the modification of the machine-ready instructions further comprises:
    changing a speed for moving a printhead from which metal drops are ejected to form the metal object that are identified in the machine-ready instructions.

10. The method of claim 7, the changing of the drop spacing parameters further comprises:
    changing at least one tool path within a layer using a height error identified within the object.

11. The method of claim 1, the performance of the compensation action further comprising:
    identifying a geometric discrepancy using the dimensional image data and a digital data model or a surface data model;
    operating a subtractive device using the identified geometric discrepancy to remove material from the object.

12. The method of claim 1, the performance of the compensation action further comprising:
    operating an environmental device to alter at least one of the identified thermal conditions.

13. A method for operating a three-dimensional (3D) metal object manufacturing system comprising:
    receiving dimensional data of an object being manufactured by the 3D metal object manufacturing system from at least one measuring device in the 3D metal object manufacturing system;
    generating thermograms of temperature intensities on a metal object being formed by the 3D metal object manufacturing system;
    processing the generated thermograms to generate thermal image data of the metal object being formed by the 3D metal object manufacturing system prior to completion of the metal object;
    identifying thermal conditions using the generated thermal image data and the dimensional image data;
    comparing the identified thermal conditions to predetermined ranges corresponding to the identified thermal conditions;
    performing a compensation action in response to at least one of the identified thermal conditions being outside one of the predetermined ranges that corresponds to the at least one identified thermal condition;
    comparing the received dimensional data to a digital data model or a surface data model of the object to identify at least one geometric discrepancy;
    modifying a portion of the surface data model corresponding to metal object layers not yet formed in response to the at least one geometric discrepancy being outside a predetermined range;
    generating machine-ready instructions using the modified portion of the surface data model; and
    operating the 3D metal object manufacturing system using the machine-ready instructions generated from the modified portion of the surface data model.

14. The method of claim 13 wherein the surface data model is standard tessellation language (STL) data of the metal object.

15. The method of claim 13 further comprising:
modifying waveforms used to operate a liquid metal drop ejector in the 3D metal object manufacturing system.

16. The method of claim 15, the modification of the waveforms further comprising:
modifying one or more pulses of the waveform by modifying at least one of a width, a magnitude, and a shape of the at least one of the one or more pulses.

17. The method of claim 16, the modification of the one or more pulses further comprising:
modifying a temporal delay between pulses.

18. The method of claim 13 further comprising:
modifying a temperature of a liquid metal drop ejector in the 3D metal object manufacturing system.

19. The method of claim 13 further comprising:
modifying a frequency of metal drop ejection of a liquid metal drop ejector in the 3D metal object manufacturing system.

20. The method of claim 19 further comprising:
modifying the frequency at a specific feature of the object.

21. The method of claim 13, the modification of the surface data model further comprising:
modifying a portion of a tool path.

22. The method of claim 21, the modification of the portion of the tool path further comprising:
modifying a position of the modified portion of the tool path.

23. The method of claim 21, the modification of the portion of the tool path further comprising:
modifying a drop spacing of the portion of the tool path.

24. The method of claim 21, the modification of the portion of the tool path further comprising:
modifying the portion of the toolpath at one of a perimeter, an infill, an overhang, and a bridge of the object.

25. The method of claim 13 further comprising:
operating a subtractive component to remove material from the object.

26. The method of claim 25, the operation of the subtractive component further comprising:
removing material along a Z-axis in the object to compensate for the identified at least one geometric discrepancy.

27. The method of claim 25, the operation of the subtractive component further comprising:
removing material in an X-Y plane in the object to compensate for the identified at least one geometric discrepancy.

28. The method of claim 25, the operation of the subtractive device further comprising:
operating a 5-axis milling machine using the identified at least one geometric discrepancy to remove the material from the object.

29. The method of claim 25, the operation of the subtractive device further comprising:
operating an electrical discharge milling machine using the identified at least one geometric discrepancy to remove the material from the object.

30. The method of claim 25 further comprising:
cooling a portion of the object prior to operating the subtractive device.

31. The method of claim 30, the cooling further comprising:
directing a flow of a volatile liquid at the portion of the object.

32. The method of claim 25 further comprising:
correlating a Z-axis of the subtractive device with a Z-axis of the object.

* * * * *